R. W. DAVIS.
RAILWAY CAR TRUCK.
APPLICATION FILED SEPT. 22, 1914.
1,128,110.
Patented Feb. 9, 1915.
3 SHEETS—SHEET 3.
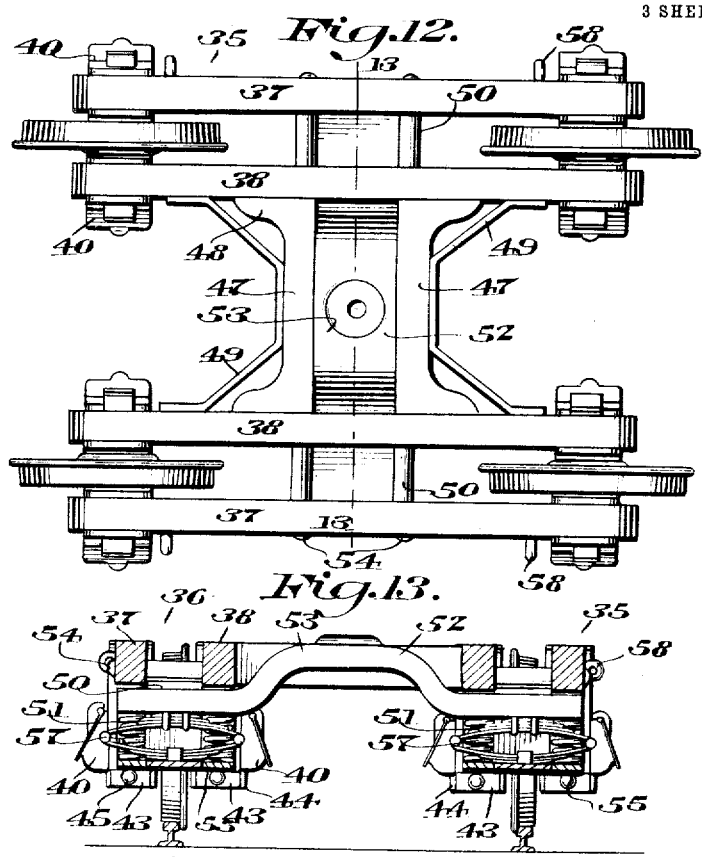
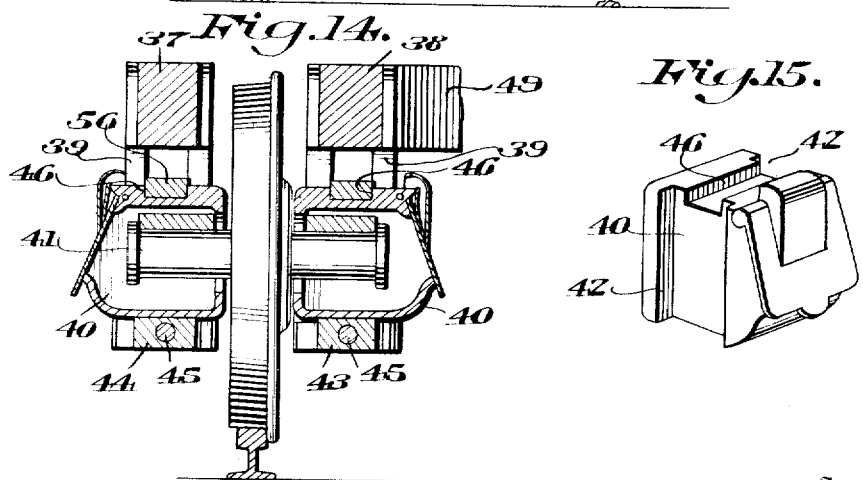
Witnesses
Inventor
Ray W. Davis
By Victor J. Evans
Attorney

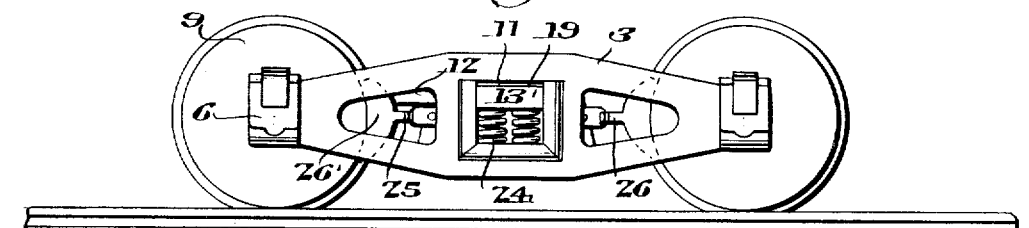
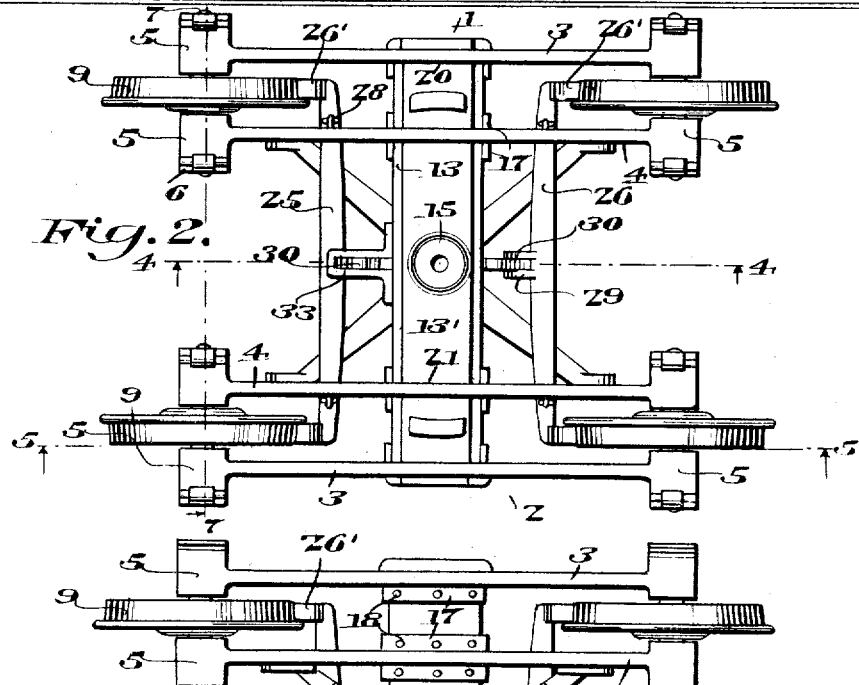
R. W. DAVIS.
RAILWAY CAR TRUCK.
APPLICATION FILED SEPT. 22, 1914.
1,128,110. Patented Feb. 9, 1915.
3 SHEETS—SHEET 1.
Inventor
Ray W. Davis
By Victor J. Evans
Attorney
Witnesses

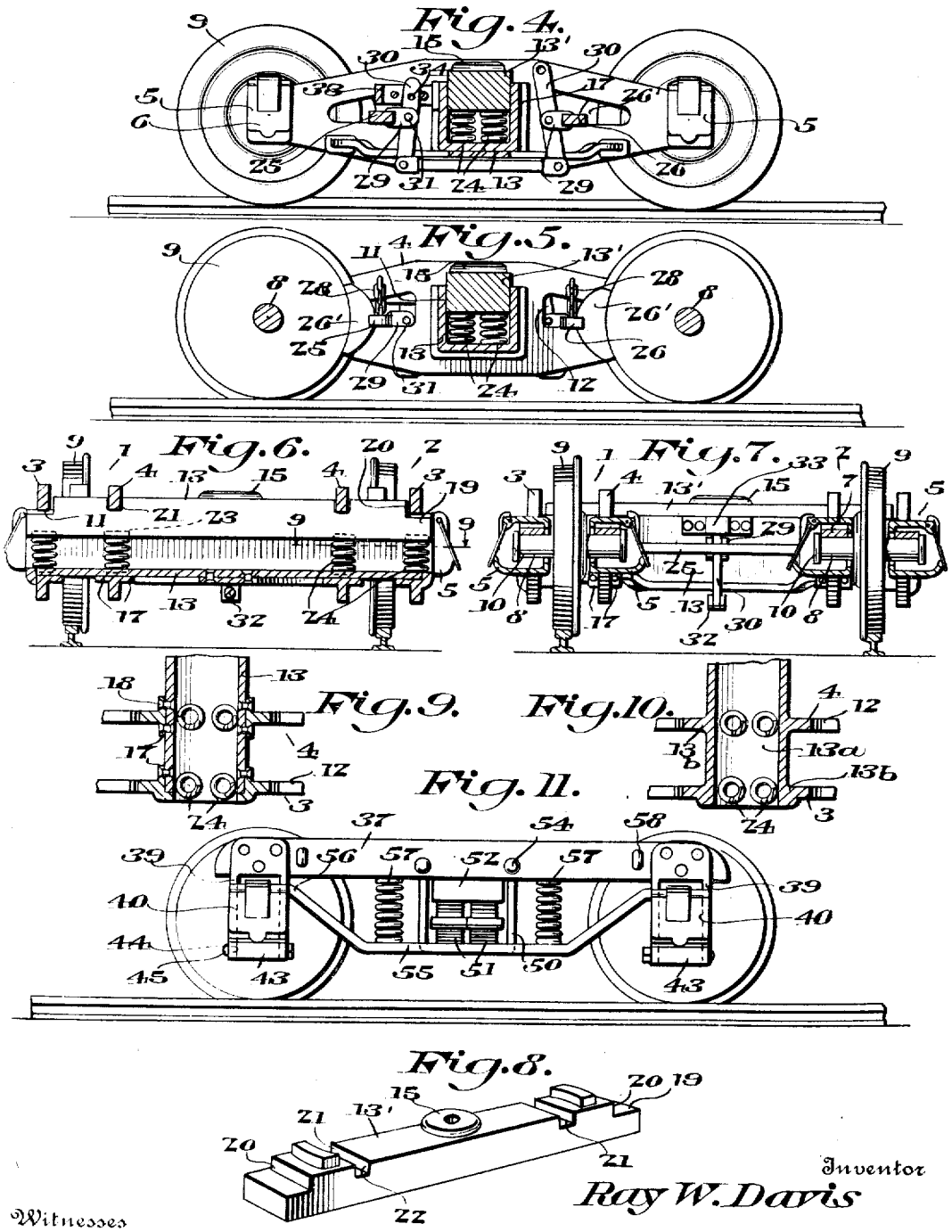

UNITED STATES PATENT OFFICE.

RAY W. DAVIS, OF BROWNSVILLE, PENNSYLVANIA, ASSIGNOR OF ONE-HALF TO WALTER B. CHALFANT, OF BROWNSVILLE, PENNSYLVANIA.

RAILWAY-CAR TRUCK.

1,128,110.  Specification of Letters Patent.  Patented Feb. 9, 1915.

Application filed September 22, 1914. Serial No. 862,973.

*To all whom it may concern:*

Be it known that I, RAY W. DAVIS, a citizen of the United States, residing at Brownsville, in the county of Fayette and State of Pennsylvania, have invented new and useful Improvements in Railway-Car Trucks, of which the following is a specification.

This invention relates to railway car trucks, and its primary object it to provide a truck of maximum simplicity, and also of maximum strength and durability, whereby objections to the present types of trucks will be avoided.

A further object of the invention is to provide a truck in which each side plate is composed of a pair of complemental plates, between which pairs of plates the wheels are journaled upon independent axles, whereby increased strength and durability are obtained, and a truck of greater flexibility and capability of rounding sharp curves produced.

A still further object of the invention is to provide a construction of truck in which the bolster is mounted in a novel manner, and a support for the bolster furnished which also serves as a connecting and bracing medium uniting the side plates of the truck.

A still further object of the invention is to provide a novel mode of mounting the wheels, whereby each wheel may revolve at any required speed without regard to the speed of revolution of any of the other wheels, so that a differential speed action may be obtained without strain upon the journals or upon the portions of the truck.

A still further object of the invention is to provide a construction of truck which obviates the use of axles extending across the truck, and the liability of bending of the axles, which also provides for the secure retention of the bolster and its resilient mounting, and which further provides a means for preventing the brake beams from falling in the event of breakage of any of the beam hangers.

The invention consists of the features of construction, combination and arrangement of parts herein fully described and claimed, reference being had to the accompanying drawings in which:—

Figure 1 is a side elevation of a car truck embodying my invention as adapted particularly for use as a freight car truck. Fig. 2 is a top plan view of the same. Fig. 3 is a bottom plan view. Fig. 4 is a central, vertical, longitudinal section. Fig. 5 is a vertical, longitudinal section on line 5—5 of Fig. 2. Fig. 6 is a central, vertical, transverse section. Fig. 7 is a vertical, transverse section on the line 7—7 of Fig. 2. Fig. 8 is a perspective view of the bolster detached. Fig. 9 is a detail horizontal section on the line 9—9 of Fig. 6. Fig. 10 is a similar view showing a modification. Fig. 11 is a side elevation of a passenger car truck embodying my invention. Fig. 12 is a side elevation of the same. Fig. 13 is a vertical transverse section on the line 13—13 of Fig. 12. Fig. 14 is a sectional view through one end of a sill side plate, and the yoke, journal box and parts associated therewith. Fig. 15 is a detail view of the journal box detached.

Referring to Figs. 1 to 10 inclusive, of the drawings, the numerals 1 and 2 designate the side members of the truck, each of which comprises an outer side plate or sill 3 and an inner side plate or sill 4. The sets of side plates or sills are disposed in parallel relation, and at the ends of the pairs of side plates are arranged coöperating pairs of journal boxes 5, each provided with the usual lid or cover 6. Within these bearing boxes are disposed the bearing brasses 7 in which are journaled the ends of short axles 8, to which are keyed or otherwise fixed the wheels 9. The axles 8 are provided with collars 10 to hold them against endwise displacement to prevent springing or relative lateral motion of the journal boxes. By this arrangement and mode of mounting the wheels it is evident that the wheels are adapted to revolve at the same or different speeds upon independent axes, and hence are permitted to have a more flexible and efficient differential action in turning curves of different radii than wheels of ordinary construction mounted in pairs upon continuous cross axles, wherein provision must be made to adapt the wheels at opposite sides to revolve at different speeds when required. Furthermore, by mounting the wheels upon independent axles, the cost of construction is materially less than with the use of continuous cross axles, and all liability of the axles bending or buckling is avoided, thus overcoming a source of objection to axles of ordinary construction. The side plates may be of any suitable or conventional form and are provided with intermediate openings 11 and end openings 12 between the said intermediate openings and the journal boxes, the openings 12 being designed for the purpose of reducing weight as well as to provide for the mounting of the brake levers as hereinafter described. The central openings 11 receive a holder and guide 13 for the reception of the bolster 13′, which is provided with the usual central bearing 15 and side bearings 16 for connection with the car body in the usual manner. As shown, the holder and guide 13 is in the form of a comparatively long and narrow box or trough shaped body extending the full width of the truck. This body may be made of sheet or cast metal, and in the process of assembling the parts is slipped longitudinally into position through the openings 12. When the boxes are made of sheet metal or formed independently of the side members 1 and 2, the plates of the side members are formed with flanges 17 lapping the sides of the box and united thereto by bolts or rivets 18, the bolster trough or box being thereby firmly fastened to the side members and serving as an element for holding said side members in proper relative position. The bolster box or trough may, however, be cast integral with the side members, all of the parts of which may be cast together, as illustrated in Fig. 10, wherein the bolster body 13ᵃ is shown as being integral with the side plates 3 and 4 at the points of union 13ᵇ. The bolster 14 is cut away at its ends to provide reduced portions 19 which fit within the outer ends of the box or trough 13 and bear against the upper walls of said openings, the said cut away portions thereon providing shoulders 20, and assisting in holding the bolster against endwise displacement. The bolster is further formed with transverse grooves or recesses 21 at the points where it passes through the openings 11 in the inner side plates 4, which grooves or recesses are adapted to receive and engage the superposed portions of said side plates forming the upper walls of the openings 11 thereof, whereby the bolster is additionally held in position and the shoulders 22 provided by the side walls of the grooves for coöperation with the shoulders 20 to hold the bolster against endwise movement while permitting it to have vertical motion. In line with the respective side plates, the bottom surface of the bolster and bottom wall of the bolster box are formed with sockets 23 to receive the ends of coiled sustaining and cushioning springs 24, whereby the bolster is supported under the weight of the car and permitted to have vertical motion for the usual cushioning action. It will, of course, be understood that the bolster is slipped endwise in position into the box from either side of the truck and the springs applied in any suitable manner. It will be evident that this construction results in the production of a truck body or frame which is of maximum strength and durability and at the same time provides for the retention of the bolster in such a way as to obviate its casual displacement under any and all conditions of service. In practice, the side members of the truck may be braced and reinforced in any suitable additional manner, and may be connected with the car body in the ordinary way by the usual bracing and limitation chains. Either inside or outside brake beams may be employed upon the improved truck. In the present instance inside brake beams 25 and 26 are shown, the ends of which beams extend through the openings 12 in the inner side plates 4 into the spaces between the sets of side plates and carry brake shoes 26 to engage the wheels. The ends of the brake beams are sustained by chains or other flexible hangers 28 from the inner side plates 4, and it will be observed that by the construction and arrangement described the beams will be held and supported even in the event of the breakage of the hangers, and can not therefore drop down upon the track and cause trouble or damage. The ends of the beams preferably run in guided contact with the lower walls of the openings 12, and, as shown, the beams are provided with spaced apertured ears 29 for the reception and passage of levers 30, to which the beams are pivoted, as at 31. The lower ends of these levers are connected for movement in unison by a motion transmitting link 32. One of the levers has its upper end fitted within a slotted supporting bracket 33 formed or secured upon the bolster box and pivotally connected therewith, as at 34, while the upper end of the other lever 30 is adapted for connection in the usual manner with the main brake lever of the brake mechanism on the car, whereby the brakes may be applied and released in the ordinary way.

It will be obvious that by mounting the brake beams in the manner described they will not only be effectually supported and guided, but can not possibly fall or become displaced from the truck, the advantages of which are evident. Furthermore, it will be evident that in case a wheel should happen to work loose on the axle or journal, it will still be retained in position, avoiding liability of damage or derailment of the truck.

In the form of my invention illustrated in Figs. 11 to 15, inclusive, wherein the invention is embodied in a truck designed especially for use upon passenger coaches, the same general construction as that previously described is employed, except that certain modifications are made to adapt the truck for use in connection with passenger car service. As shown, the truck comprises side members 35 and 36, each comprising an outer side plate or sill 37 and an inner side plate or sill 38, which are disposed in parallel relation and may be made of wood, metal or other suitable material. At the ends of the pairs of side plates are forked hanger brackets or yokes 39 which may be integral with or secured to the sills, and which receive the journal boxes 40, provided with suitable bearings for the wheel axles or journals 41. Each journal box is provided in its opposite sides with grooves or channels 42 to receive the arms of the yoke, and is retained in position by a bridge plate 43 having channeled or slotted ends 44 engaging the yoke arms, the said bridge plate and yoke arms being provided with alined openings for passage of a bolt 45, whereby the journal box and bridge plate are held confined within the yoke against any possibility of casual displacement. The upper surfaces of the journal boxes are formed with receiving or seat grooves 46, for a purpose hereinafter described. The inner plates or sills 38 of the side members are connected by cross plates or sills 47, which may be flanged at their ends and riveted to the inner side plates 38, as indicated at 48, or cast integral with the side plates, as desired. These cross sills take the place of the central portion of the bolster box in the construction previously described, and are reinforced by angular braces 49, riveted to said cross sills and to the inner side plates. Between the inner and outer side plates or sills at each side of the truck are U-shaped or trough shaped hangers 50 in which are disposed bowed leaf springs 51, serving as supports for the bolster 52. The ends of the bolster 52 fit within the upper portions of the hangers 50 and are riveted or otherwise secured to the leaf springs, which are suitably retained against displacement, while the central portion 53 of the bolster is offset upwardly above the plane of the inner side plates and extends across the truck above the cross sills, whereby said bolster is yieldingly supported. The bolster may be provided with the usual center bearing and also with side bearings when required. Bolts 54 pass through the hangers 50 and sills and secure said hangers in position, and also connect and reinforce the series of sills in a firm and stable manner. These bolts may extend through or outside the cross sills as desired. Arranged at each side of the truck is a longitudinally extending equalizer bar 55, which is disposed beneath the outer sills 37 and have end portions 56 which are movable within guide slots or openings in the inner arms of the adjacent yokes 39 and seat within and engage the retaining grooves 46 in the journal boxes. Coiled cushioning springs 57 are interposed between each of these equalizing bars and the sill 37 on opposite sides of the transverse center of the truck. Eyebolts 58 are provided at the ends of the sills 37 for connection with the usual safety or limitation chains.

It will be observed that in the foregoing construction the frame of the truck is constructed substantially as in the freight car type of truck previously described and that the walls are mounted in the same manner, variations in construction being such as to adapt the trucks for their respective intended uses upon freight and passenger cars. In the passenger car type of truck the bolster is yieldingly supported by the springs 51 which sustain the weight of the car and allow ample resiliency and flexibility. It will be apparent that the weight first coming on the center of the bolster is thrown equally upon the four leaf springs at the opposite sides of the truck, and is thereby transferred equally to the journal boxes and axles. The pressure weight upon the springs will also be transmitted through the hangers 50 to the truck frame supported by the springs 57 from the equalizing bars 55 carried by the journal boxes, thus giving a dual cushioning support to sustain the weight, as well as all shocks, jars and vibrations. The arrangement of the spring 57 insures the coöperation of these springs with the springs 51 to permit the truck to have universal rocking motion, thus insuring a uniform transmission of all the strains and yielding support of the car body in a reliable and effective manner.

I claim:—

1. A car truck including side members, each comprising a pair of spaced side plates, said side plates having central openings therein, wheels journaled at the ends of the side members, a trough-shaped bolster box extending transversely of the truck in line with said central openings in the side plates, said trough being of a depth commensurate with said openings, a bolster mounted in said trough and in guided engagement with the plates of the side members, and supporting springs disposed between said bolster and the bottom of the bolster box.

2. A car truck including side members, each consisting of a pair of spaced, parallel plates, said plates being provided with central openings, wheels journaled at the ends of the side members, a trough-shaped bolster box extending transversely of the truck in line with said central openings in the side plates, a bolster mounted in said trough and having cut away end portions to engage the outer side plates and grooved portions to receive and engage the inner side plates, supporting springs disposed between said bolster and the bottom of the bolster box, and an X-shaped brace having its arms fixed to the inner side plates and its body at the point of union of its arms secured to the bottom of the bolster trough.

3. A car truck including side members, each comprising a pair of spaced side plates, said side plates having central openings therein, wheels journaled at the ends of the side members, a trough shaped bolster box extending transversely of the truck in line with said central openings in the side plates, a bolster mounted in said trough and having cut away end portions to engage the outer side plates and grooved portions to receive and engage the inner side plates, and supporting springs disposed between said bolster and the bottom of the bolster box.

In testimony whereof I affix my signature in presence of two witnesses.

RAY W. DAVIS.

Witnesses:
CHARLES A. FULTON,
ERNEST E. HARRISON.

It is hereby certified that in Letters Patent No. 1,128,110, granted February 9, 1915, upon the application of Ray W. Davis, of Brownsville, Pennsylvania, for an improvement in "Railway-Car Trucks," an error appears in the printed specification requiring correction as follows: Page 1, line 10, for the word "it" read *is*; and that the said Letters Patent should be read with this correction therein that the same may conform to the record of the case in the Patent Office.

Signed and sealed this 30th day of March, A. D., 1915.

[SEAL.]                         J. T. NEWTON,

*Acting Commissioner of Patents.*